United States Patent
Steer et al.

(10) Patent No.: US 7,174,170 B2
(45) Date of Patent: Feb. 6, 2007

(54) SELF-SELECTION OF RADIO FREQUENCY CHANNELS TO REDUCE CO-CHANNEL AND ADJACENT CHANNEL INTERFERENCE IN A WIRELESS DISTRIBUTED NETWORK

(75) Inventors: David Steer, Nepean (CA); Koon Hoo Teo, Nepean (CA); Adrian Smith, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 416 days.

(21) Appl. No.: 10/683,181

(22) Filed: Oct. 10, 2003

(65) Prior Publication Data

US 2004/0157613 A1 Aug. 12, 2004

Related U.S. Application Data

(60) Provisional application No. 60/480,599, filed on Jun. 20, 2003, provisional application No. 60/468,456, filed on May 7, 2003, provisional application No. 60/467,432, filed on May 2, 2003, provisional application No. 60/464,844, filed on Apr. 23, 2003, provisional application No. 60/461,579, filed on Apr. 9, 2003, provisional application No. 60/461,344, filed on Apr. 9, 2003, provisional application No. 60/454,715, filed on Mar. 15, 2003, provisional application No. 60/453,840, filed on Mar. 11, 2003, provisional application No. 60/453,011, filed on Mar. 7, 2003, provisional application No. 60/451,897, filed on Mar. 4, 2003, provisional application No. 60/447,646, filed on Feb. 14, 2003, provisional application No. 60/447,645, filed on Feb. 14, 2003, provisional application No. 60/447,644, filed on Feb. 14, 2003, provisional application No. 60/447,643, filed on Feb. 14, 2003, provisional application No. 60/447,527, filed on Feb. 14, 2003, provisional application No. 60/446,619, filed on Feb. 12, 2003, provisional application No. 60/446,618, filed on Feb. 12, 2003, provisional application No. 60/446,617, filed on Feb. 12, 2003.

(51) Int. Cl.
    *H04Q 7/20* (2006.01)
(52) U.S. Cl. .................. 455/446; 455/422.1; 455/434; 455/443; 455/445; 455/447; 455/450
(58) Field of Classification Search ............... 455/445, 455/446, 447, 504, 436, 67.1, 448; 370/337, 370/350, 436, 442
    See application file for complete search history.

(56) References Cited

U.S. PATENT DOCUMENTS 6,331,973 B1 12/2001 Krueger et al.

(Continued)

OTHER PUBLICATIONS

Nasipuri A et al: "A MAC protocol for mobile ad hoc networks using directional antennas"; IEEE, vol. 3, Sep. 23, 2000; pp. 1214-1219; XP010532719; the whole document.

*Primary Examiner*—Joseph Feild
*Assistant Examiner*—Julio Perez
(74) *Attorney, Agent, or Firm*—Garlick Harrison & Markison; James A. Harrison (57) ABSTRACT

A wireless network node and a network provide for automatic self-deployment of the radio frequency channels without the need for preplanning. Each wireless network node adapts to the inclusion of a new node and to changing local conditions without requiring manual configuration at deployment or re-deployment. When a node is added to the network, it scans and finds its neighbors, and enters a frequency self-selection phase of its initialization process. The method for frequency self-selection involves transmitting and receiving a sequence of messages to/from neighbors and performing related processing within the controller unit of the node. Three sets of parameters are used in the frequency self-selection algorithm. The three parameter sets include a routing cost function, the frequencies in use by neighbors (and those that may be blocked), and the antenna beams used for the respective frequencies.

20 Claims, 7 Drawing Sheets

U.S. PATENT DOCUMENTS

2002/0137538 A1* 9/2002 Chen et al. ................. 455/550
2002/0142788 A1* 10/2002 Chawla et al. ............. 455/504
2002/0176396 A1 11/2002 Hammel et al.
2002/0188723 A1 12/2002 Mangold et al.
2003/0190916 A1* 10/2003 Celedon et al. ............. 455/437
2004/0203805 A1* 10/2004 Khawand .................... 455/448
2004/0248578 A1* 12/2004 Korpela et al. ............. 455/446
2005/0020293 A1* 1/2005 Moore ........................ 455/515

* cited by examiner

FIG. 1
communication network 10

FIG. 2 wireless network node 34 and dual polarized multi-beam antenna system 36

SELF-SELECTION OF RADIO FREQUENCY CHANNELS TO REDUCE CO-CHANNEL AND ADJACENT CHANNEL INTERFERENCE IN A WIRELESS DISTRIBUTED NETWORK

CROSS REFERENCE TO RELATED APPLICATIONS

This application is related to and incorporates by reference and claims priority under 35 U.S.C. 119 the following provisional applications for patent:
1) U.S. Patent Application Ser. No. 60/446,617 filed on Feb. 12, 2003 and entitled "System for Coordination of Multi Beam Transit Radio Links for a Distributed Wireless Access System";
2) U.S. Patent Application Ser. No. 60/446,618 filed on Feb. 12, 2003 and entitled "Rendezvous Coordination of Beamed Transit Radio Links for a Distributed Multi-Hop Wireless Access System";
3) U.S. Patent Application Ser. No. 60/446,619 filed on Feb. 12, 2003 and entitled "Distributed Multi-Beam Wireless System Capable of Node Discovery, Rediscovery and Interference Mitigation";
4) U.S. Patent Application Ser. No. 60/447,527 filed on Feb. 14, 2003 and entitled "Cylindrical Multibeam Planar Antenna Structure and Method of Fabrication";
5) U.S. Patent Application Ser. No. 60/447,643 filed on Feb. 14, 2003 and entitled "An Omni-Directional Antenna";
6) U.S. Patent Application Ser. No. 60/447,644 filed on Feb. 14, 2003 and entitled "Antenna Diversity";
7) U.S. Patent Application Ser. No. 60/447,645 filed on Feb. 14, 2003 and entitled "Wireless Antennas, Networks, Methods, Software, and Services";
8) U.S. Patent Application Ser. No. 60/447,646 filed on Feb. 14, 2003 and entitled "Wireless Communication";
9) U.S. Patent Application Ser. No. 60/451,897 filed on Mar. 4, 2003 and entitled "Offsetting Patch Antennas on an Omni-Directional Multi-Facetted Array to allow Space for an Interconnection Board";
10) U.S. Patent Application Ser. No. 60/453,011 filed on Mar. 7, 2003 and entitled "Method to Enhance Link Range in a Distributed Multi-hop Wireless Network using Self-Configurable Antenna";
11) U.S. Patent Application Ser. No. 60/453,840 filed on Mar. 11, 2003 and entitled "Operation and Control of a High Gain Phased Array Antenna in a Distributed Wireless Network";
12) U.S. Patent Application Ser. No. 60/454,715 filed on Mar. 15, 2003 and entitled "Directive Antenna System in a Distributed Wireless Network";
13) U.S. Patent Application Ser. No. 60/461,344 filed on Apr. 9, 2003 and entitled "Method of Assessing Indoor-Outdoor Location of Wireless Access Node";
14) U.S. Patent Application Ser. No. 60/461,579 filed on Apr. 9, 2003 and entitled "Minimisation of Radio Resource Usage in Multi-Hop Networks with Multiple Routings";
15) U.S. Patent Application Ser. No. 60/464,844 filed on Apr. 23, 2003 and entitled "Improving IP QoS though Host-Based Constrained Routing in Mobile Environments";
16) U.S. Patent Application Ser. No. 60/467,432 filed on May 2, 2003 and entitled "A Method for Path Discovery and Selection in Ad Hoc Wireless Networks";
17) U.S. Patent Application Ser. No. 60/468,456 filed on May 7, 2003 and entitled "A Method for the Self-Selection of Radio Frequency Channels to Reduce Co-Channel and Adjacent Channel Interference in a Wireless Distributed Network"; and
18) U.S. Patent Application Ser. No. 60/480,599 filed on Jun. 20, 2003 and entitled "Channel Selection";

This application is related to and incorporates by reference the co-pending application having at least one inventor in common, which application is being filed concurrently herewith, entitled "Minimization of Radio Resource Usage in Multi-hop Networks with Multiple Routings" having a Ser. No. of 10/683,182.

TECHNICAL FIELD OF THE INVENTION

This invention relates generally to wireless communication systems and, more particularly, to traffic routing and frequency selection between wireless network nodes and a network access node.

DESCRIPTION OF RELATED ART

The structure and operation of wireless communication systems are generally known. Examples of such wireless communication systems include cellular systems and wireless local area networks (WLAN), among others. Equipment that is deployed in these communication systems is typically built to comply with standardized operations, i.e., operating standards. These operating standards prescribe particular carrier frequencies, modulation types, baud rates, physical layer frame structures, medium access control (MAC) layer operations, link layer operations, signaling protocols, etc. By complying with these operating standards, equipment interoperability is achieved.

In a cellular system, a regulatory body typically licenses a frequency spectrum for a corresponding geographic area (service area) that is used by a licensed system operator to provide wireless service within the service area. Based upon the licensed spectrum and the operating standards employed for the service area, the system operator deploys a plurality of carrier frequencies (channels) within the frequency spectrum that support the subscriber units within the service area.

In cellular systems, a plurality of base stations is distributed across the service area. Each base station services wireless communications within a respective cell. Each cell may be further subdivided into a plurality of sectors. In many cellular systems, e.g., GSM cellular systems, each base station supports forward link communications (from the base station to subscriber units) on a first set of carrier frequencies, and reverse link communications (from subscriber units to the base station) on a second set of carrier frequencies. The first set and second set of carrier frequencies supported by the base station are a subset of all of the carriers within the licensed frequency spectrum. In most, if not all, cellular systems, carrier frequencies are reused so that interference between base stations using the same carrier frequencies is minimized and system capacity is increased. Typically, base stations using the same carrier frequencies are geographically separated so that minimal interference results. Similarly, a plurality of WLAN base stations (often called Access Points) is distributed across the service area. And, the carrier frequencies for these are also reused to minimize interference between access points.

Traditional wireless mobile networks include Mobile Station Controllers (MSCs), Base Station Controllers (BSCs) and Base Station Transceiver Sets (BTSs) which jointly operate to communicate with mobile stations over a wireless communication link. The BSCs and BTSs collectively are referred to as BSs or base stations. The traffic from the user terminals is then routed across the network of base stations or access points to reach the destination user or to reach another network where the destination user or service is located. In the design of these networks the optimum assignment of carrier frequencies and the routing of traffic across the network are important factors in achieving the desired cost and performance of the system.

Wireless cellular communication service providers, as well as Internet service providers, are increasingly working together to provide seamless end-to-end call connectivity across the various platforms to enable users to establish point-to-point connections independent of terminal type and location. Traditionally, voice networks have paved the way for the creation of data networks.

Today, however, there are many forms of packet data networks, including various versions of the Internet in which a computer is coupled directly using a broadband access technology such as cable modems, digital subscriber line modems, etc. The next generation of cellular networks presently being developed is being enhanced from traditional systems to create the ability for mobile stations to receive and transmit data in a manner that provides greatly increased throughput rates. For example, many new mobile stations, often referred to as mobile terminals or access terminals, are being developed to enable a user to surf the web or send and receive e-mail messages through the wireless channel, as well as to be able to receive continuous-bit-rate data, including so called "streaming data". Accordingly, different systems and networks are being developed to expand such capabilities and to improve their operational characteristics.

In addition to the ongoing efforts to provide wireless data access through wireless cellular networks as described above, many developmental efforts are directed to building home and office wireless local area networks according to any one of a plurality of technologies and protocols. For example, Bluetooth and IEEE 802.11(b) provide for 2.4 giga-Hertz (GHz) band wireless networks. IEEE 802.11(a), on the other hand, provides for local area networks using the bands between 5.15 and 5.85 giga-Hertz (GHz). In a home environment, only one or two access points may be needed to provide coverage for access to a network access node. In these and other environments, however with larger coverage areas; a multi-hop network is possible in which a plurality of wireless network nodes are used to collectively define a path from a mobile client to a destination node, or another network node by way of one or more wireless network nodes (WNN). Generally, a channel is established from each node to another defining the path to the network access node, which, in turn, provides access to an external network, such as the Internet. The channel may also be from one WNN to another in the same network when the destination is a user associated with WNN.

Multi-hop networks are often advantageous for providing network access for a client regardless of the underlying network, whether it is a cellular network or a wireless local area network. One problem with cellular, WLAN and multi-hop networks, however, is that set-up and maintenance are labor intensive by their nature because the specific channels between wireless network nodes have required being manually pre-defined prior to use.

The traditional method of assigning frequencies in wireless communications networks is to develop the assignment "manually" and to configure each node as to its assigned frequency. Often the planned deployment of the nodes is studied in an overall plan and the frequency assignment is determined by an engineer (or sometimes a team of engineers) studying the neighborhood and assigning the frequencies across the network to minimize co-channel and adjacent channel interference. This method is slow and labor intensive and requires considerable planning in advance of the deployment. A further problem with traditional methods is that, if a node is to be added to an existing network, typically the plan must be studied and reworked. Many other nodes in the neighborhood, in addition to the new node, may need reassignment of frequency channels to accommodate the new node. This also is a labor-intensive process, and inhibits the rapid deployment of new nodes in areas where additional nodes are needed to cover traffic growth.

In one prior art approach, the channels are simply assigned randomly (i.e., without any specific site planning). Although this is a simple method, it generally does not minimize the interference and there may be significant interference problems (i.e., the performance of the deployed network cannot be guaranteed).

The traditional methods of frequency assignment become quite difficult when only a small number of channels are available. Frequency channel assignment also becomes difficult when the number of nodes exceeds the number of channels available. For example, a re-use plan involving seven frequency channels is often used for mobile radio cellular systems. This plan requires there to be a set of seven radio frequency channels available across the whole of the mobile network (i.e., at each node). The re-use of this seven-channel plan breaks down when there are only three or four channels available or the radio signals from individual nodes can propagate to interfere with several of the neighbors in many directions. In the typical application of self-deploying networks in an unlicensed frequency band, a set of seven channels is not available, and so the traditional repetitive planning methods are unsuitable.

For each of the foregoing reasons, there exists a need for a method and an apparatus for assigning frequencies to nodes in a network, and especially in a multi-hop network, that is flexible and that is more efficient in terms of deployment and maintenance.

BRIEF SUMMARY OF THE INVENTION

A method and apparatus provide automatic self-deployment of the radio frequency channels without the need for preplanning to achieve savings in time and cost of deployment. The inventive method and apparatus also allow the network to automatically adapt to the inclusion of a new node or, for example, changing local conditions that may block the use of a channel due to local interference. The method and apparatus are especially suitable for applications using unlicensed frequency channels where the availability of channels may be different in various areas across the network. The automatic self-determination of the node's frequency channel avoids the need for the manual configuration at deployment or re-deployment and, therefore, saves time and expense. The manner in which the automatic self-determination is made is a function of several factors or situations. For example, one set of procedures that are followed whenever a node is added to an existing network includes a set of exemplary steps.

When a node is deployed (and is to be added to the network), the node actively scans and finds its neighbors (initial search phase) and negotiates entry onto the network, as discussed in the referenced applications listed in the Cross Reference to Related Applications above. Once the node is authenticated it enters a frequency self-selection phase of its initialization process. The method for frequency self-selection involves transmitting and receiving a sequence of messages to/from neighbors and performing related processing within the controller unit of the node. The new node exchanges a series of messages with each of its neighbors and from these derives three sets of parameters that are used in the frequency self-selection algorithm. The three parameter sets include routing cost function, frequencies in use by neighbors (and those that may be locally blocked), antenna beams and other physical layer parameters such as polarization used for the respective frequencies.

The routing cost function enables the node to decide which neighboring node offers the best (lowest cost) route back to the network. The routing cost function can be calculated based on many factors, including, for example, the neighboring node's cost function plus the transit link cost function to that particular node. Since not all the transit links will have the same signal-to-noise ratio due to proximity and propagation conditions, they will run at different data rates (and have different cost functions). Generally, however, the selection of a frequency channel and corresponding wireless network node with which a link will be established includes selecting one that maximizes the radio propagation distance to minimize the interference among the frequencies used in a neighborhood of wireless network nodes across the network. The routing cost function is used by a node to help it determine the local topology of interconnection and frequency usage by neighboring nodes. Understanding of the topology then enables the node to select its frequencies of operation such that there will be the least interference with other neighbors using the same frequencies. The process used to operationally route traffic in the network need not be the same as that used by the frequency selection process, and the frequency selection need not be changed if the operational routing of the traffic changes.

The frequencies in use by neighboring wireless network nodes (neighbors) is determined by the node so that it does not select a frequency for which interference with the neighbor would occur. The node learns about each of its neighbors' neighborhood frequency during the initial search phase. During the message exchange phase each neighbor also informs the node of the frequencies of its neighbors and which are primary and secondary frequencies.

Finally, the node requests information regarding beam information. Generally each node has a multiplicity of directional antenna beams. In one embodiment, an antenna system can provide six directional beams. Communication over each transit link to each respective neighbor is by way of one such beam of each node. The beam selected for each link is chosen on the basis of an appropriate criterion, such as the highest received signal strength; hence, the directional nature of the antenna beams improves the link gain and also decreases the signal strength from interfering sources if they arrive from different angular directions.

While the foregoing describes a summary of the invention in a situation in which a node is added to a network, it is understood that the steps described may also, and are, applied to other circumstances, including a previously determined optimum path no longer being the optimum path. Some or all of the above-described steps may also be applied by a node when another node has been added to the network. As such, the new node may render a present link path less optimum or may provide a new path that is better than the presently defined optimum path.

DETAILED DESCRIPTION OF THE INVENTION

Figure 1:
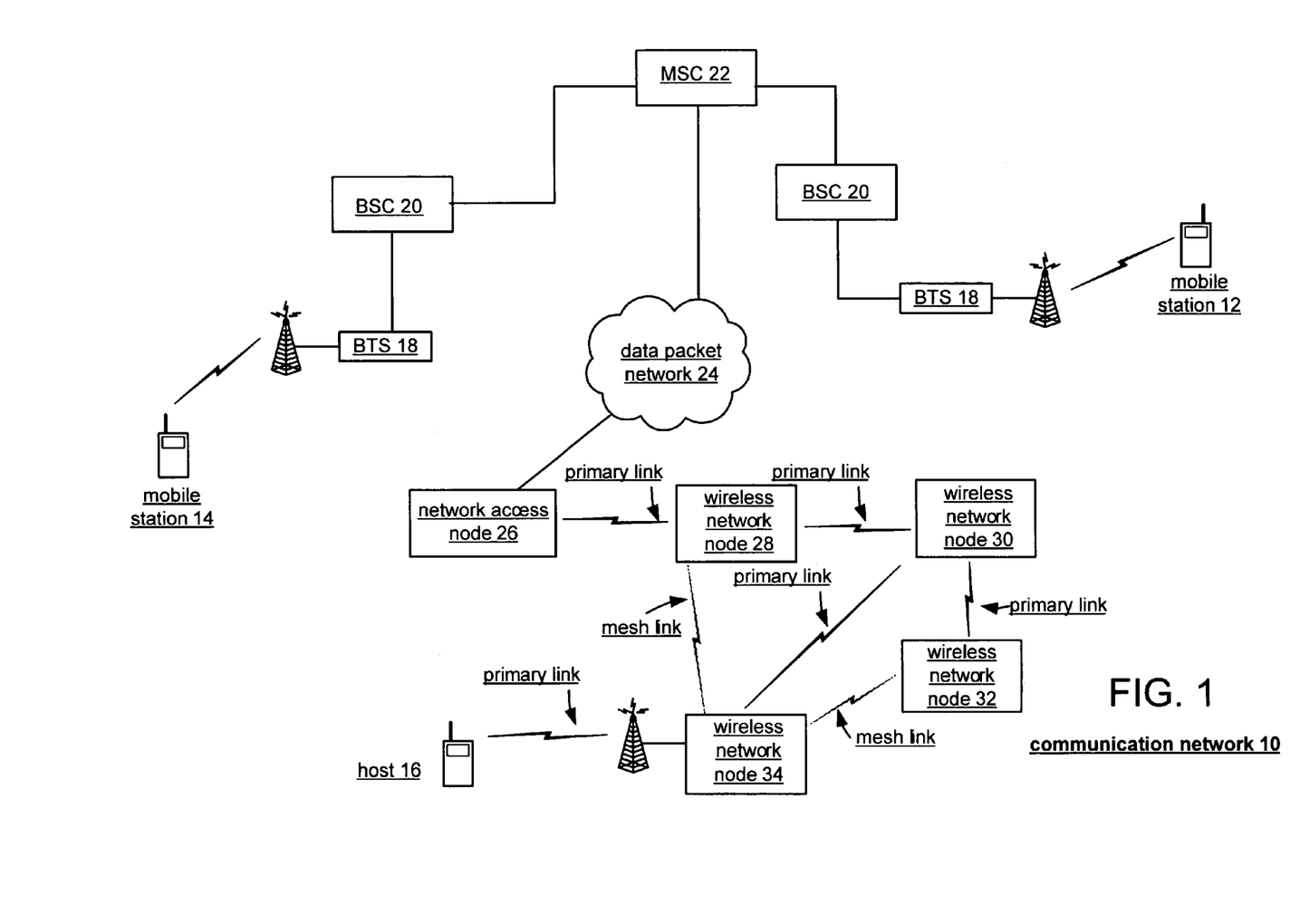
FIG. 1 is a functional block diagram of a communication network formed according to one embodiment of the present invention.

FIG. 1 is a functional block diagram of a communication network formed according to one embodiment of the present invention. A communication network 10 is configured to allow a plurality of mobile stations, such as mobile stations 12 and 14 of a cellular network and a client 16 of a wireless local area network (WLAN), to communicate with each other regardless of geographic location as long as they are located in an area that is served by a service node (e.g., an wireless network node). As may be seen, each of the mobile stations 12 and 14 communicate by way of a base station transceiver system (BTS) 18, a base station controller (BSC) 20, and a mobile switching center (MSC) 22. As is known by one of average skill in the art, MSCs, such as MSC 22, provide network switching for cellular traffic according to a mobile station's location. More specifically, each MSC is coupled to at least one BSC, which, in turn, is coupled to at least one BTS. The operation of cellular networks as represented by MSC 22, BSC 20, and BTS 18 is generally known by one of average skill in the art.

Continuing to examine FIG. 1, MSC 22 also is coupled to a data packet network 24. Data packet network 24 includes any and all types of data packet networks, including any one of the known Internets, including those that operate under IP.v6 protocols. Data packet network 24 is further coupled to a network access node 26. Network access node 26 provides access to data packet network 24 for clients, such as client 16, that couple directly to network access node 26 or that couple to network access node 26 by one or more wireless network nodes. In the example of FIG. 1, client 16 is coupled to network access node 26 by way of wireless network nodes 28, 30 and 34. As may further be seen, the closest wireless network node to wireless network node 34 is wireless network node 32. As will be explained in greater detail in a co-pending patent application being filed concurrently herewith, a wireless network node does not always establish a preferred communication link in a multi-hop network with the closest wireless network node.

For the sake of simplicity, the network of FIG. 1 is depicted as having a number of wireless network nodes (WNN) that are distributed about the region to be covered and are linked together, and to the main communications network, with transit radio links. The terms "node" or "wireless network node", as used in conjunction with the description of the present invention, contemplates a component having a co-located access and transit functionality or it may include only transit functionality. The wireless terminals communicate with the nodes using the access radio links, and the traffic is forwarded between the wireless network nodes using the transit radio links to reach the network access node and the communications network. It is also possible for the traffic to be forwarded between the nodes to reach another terminal that is also attached to the same local area network without the presence of the network access node (or the associated external network).

In operation, the present invention addresses the long felt need for automatic frequency assignment among the various nodes as part of establishing a wireless communications network. More specifically, an wireless network node that will eventually provide service for the client 16 seeking to establish access to an external node, terminal or network such as data packet network 24, establishes a communication link with neighboring wireless network nodes using protocol compliant signaling for the protocol under which it operates to determine, generally, three different parameter sets. The three parameter sets are: routing cost function; frequencies in use (and those that may be locally blocked); and antenna beams used for the respective frequencies.

The routing cost function enables the node to decide which neighboring node offers the best (lowest cost) route back to the network (here, data packet network 24). The routing cost function can be calculated based on many factors. As an example, it may be calculated as the neighboring node's cost function plus the transit link cost function to that particular node. Since not all the transit links will have the same signal-to-noise ratio due to proximity and propagation conditions, they will run at different data rates (and have different cost functions). The link cost function may be the inverse of the data rate on the link when exchanging messages which represents the nominal cost in transmission time of using the link. The neighboring node that offers the best route is called the node's "best neighbor". The best neighbor's neighborhood frequency is called a "primary" frequency, and the transit link to the best neighbor is part of a "preferred" route. The neighborhood frequencies of all other neighbors are called "secondary" frequencies and their associated transit links are called "mesh" links. As may be seen, the link between wireless network nodes 34 and 30, in the example of FIG. 1, is a primary link. The link between wireless network nodes 30 and 32 is also a primary link for calls routed through node 32, and the links between wireless network node 34 and nodes 28 and 32, respectively, are mesh links (secondary links).

These mesh links provide alternative paths to the network access point. These links may be used for traffic in the future as the network evolves or propagation conditions change and they become preferred routes. Thus, the determination of preferred routes is not fixed for the life of the network. In the described embodiment of the invention, these routes change over time to adapt to changes in deployment, traffic and propagation conditions. The reason for distinguishing between preferred routes and mesh routes is that when traffic is flowing across the network, the majority will be flowing along preferred routes, and hence it is important that these "major highways" are free from interference. In the event that these highways do become congested or suffer interference and the traffic is delayed, the routing cost function may change accordingly, and the nodes will adapt their routing and use alternate routes across the network. The algorithm for routing and controlling the routing cost function is not part of this invention, although importantly, the frequency selection algorithm is designed to work in a changing environment and is thus working in harmony with the routing.

The routing cost function is used by a node to help it determine the local hierarchy and topology of interconnection and frequency usage by neighboring nodes. The process used to operationally route traffic in the network need not be the same as that used by the frequency selection process, and the frequency selection need not be changed if the operational routing of the traffic changes. By learning the hierarchy of the network through the use of the routing cost function, the node is able to select frequencies for its use that are not also used locally and are as far away (in terms of effective radio propagation distance) as possible in the real environment from other nodes using the same frequencies. This minimizes the interference among the nodes in the network.

The node learns about each of its neighbors' neighborhood frequency during the initial search phase. During the message exchange phase each neighbor also informs the node of the frequencies of its neighbors and which are primary and secondary frequencies.

Figure 2:
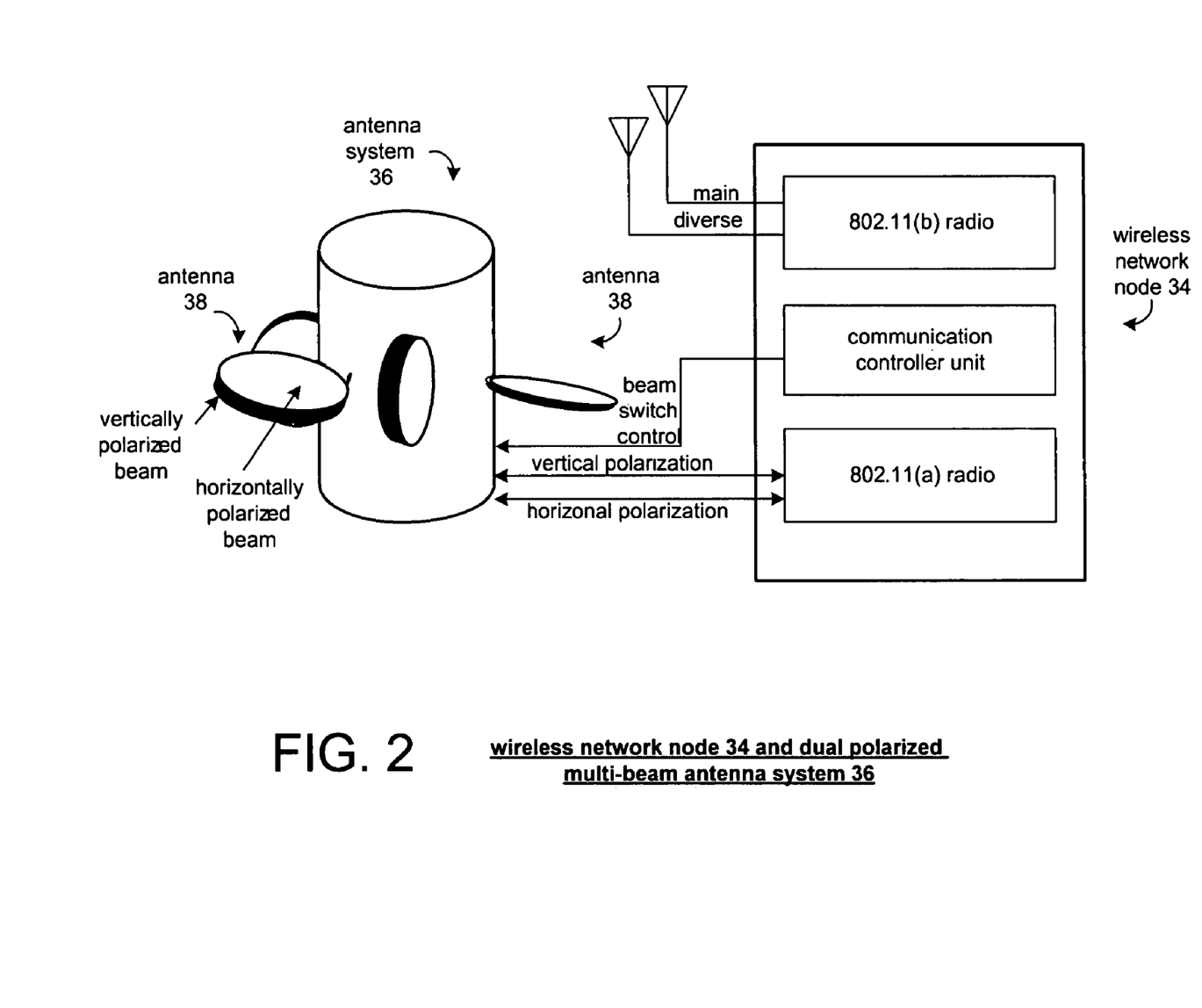
FIG. 2 illustrates an wireless network node and a dual polarized multi-beam antenna system according to one embodiment of the present invention.

FIG. 2 illustrates an wireless network node 34 and a dual polarized multi-beam antenna system 36 according to one embodiment of the present invention. Generally, each antenna system 36 includes a plurality of directional antennas 38 that radiate transmission beams that are used for establishing communication links between the nodes to carry traffic at specified or selected frequencies. Generally, communication over each transit link to each respective neighbor is via one such beam on each node. As may be seen, antenna 38 is operable to select a direction about a horizontal axis extending from a base of antenna system 36. A communication controller unit within wireless network node 34 generates beam control commands to prompt antenna system 36 to select the antennas 38 to transmit at a specified beam angle (herein referred to as "beam" and "beam selected"). As may further be seen, wireless network node 34 includes an 802.11(a) and an 802.11(b) radio transceiver. It is understood that these two types of radios are exemplary and may readily be substituted without other types of radios or technologies (e.g., Bluetooth or 802.16, or CDMA or GSM). The beam selected for each link is chosen on the basis of an appropriate criterion, such as the highest received signal strength; hence, the directional nature of the antenna beams improves the link gain and also decreases the signal strength from interfering sources if they arrive from different angular directions.

In a typical implementation of the antenna beams, the beams overlap in the angular domain (though such overlap is not required for purposes of this invention). For example, for 360 degree coverage and a six-beam arrangement, with each antenna placed on the side of a regular hexagon, each antenna beam overlaps its adjacent antenna beams at +/−30 degrees. Each node may have several neighbors and, in fact, several preferred routes. That is, each node has only one best neighbor, which is on one preferred route, but it may also be the best neighbor to several other nodes. Thus, in general, each node has a minimum of one primary frequency, but in a well-connected mesh network each node may have several primary frequencies in total.

FIG. 2 illustrates two polarizations, one that is vertical and one that is horizontal. While it is important that the two polarizations be orthogonal, any relation with the vertical or horizontal is acceptable as long as the orthogonality is maintained. For example, one desirable arrangement includes the two polarizations being set at +45 and −45 degrees relative to the vertical direction. This facilitates or enables a compact antenna arrangement.

Each node may, at one instant in time, be communicating on any one of its primary frequencies, or its neighborhood frequency, using the respective beams to its respective neighbors. The beam it uses for these communications is communicated to the new node requesting the information. In this way the new node can avoid re-using a frequency that is, for example, on the same beam, or an adjacent beam, as these may, in fact, give more interference since their beams will not provide much interference attenuation. Because antennas are not always perfect in operation, radiation around the back of the antenna will occur, as determined by the antenna's front-to-back ratio (ratio of maximum gain to gain at the back of the antenna). Moreover, the environment in which the node is deployed will give rise to multipath interference due to reflection of a transmit signal from obstacles, such as buildings, in the transmit path. Because of multipath interference and its effects, a frequency, no matter what beam it is being used on, has the potential to interfere with a neighbor if the neighbor chooses to use the same frequency. Thus, while the use of directional beam forming antennas is helpful and may increase overall capacity in a wireless network, signals operating at the same frequency may still interfere with each other. Although a frequency on any beam has the potential to interfere, those frequencies on the same beam as the new node will likely cause the strongest interference, followed by frequencies on adjacent beams, and then by the use of frequencies on any non-adjacent beam. Hence, when there exists a need for re-using a frequency to meet demand, there is a preference to what frequency should be re-used.

Figure 3:
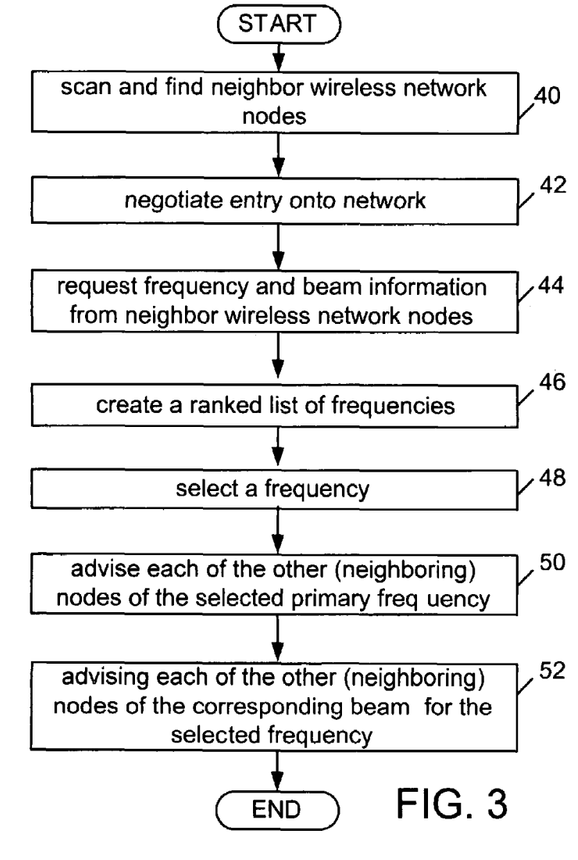
FIG. 3 illustrates a method of determining and selecting a frequency, a beam, and a best neighbor according to one embodiment of the present invention.

FIG. 3 illustrates a method of determining and selecting a frequency, a beam, and a best neighbor according to one embodiment of the present invention. In order to determine what frequencies are primary frequencies and are in use, and, more generally, to determine what frequency or frequencies are best for selection for a link from an wireless network node to a neighboring wireless network node, a new node seeking to establish a route to a network access node or a node seeking to improve its route to the network access node must determine information about the current network topology and frequency use.

More specifically, when a node is deployed, it, actively scans and finds its neighbors (initial search phase) (step 40) and negotiates entry onto the network (step 42). Generally, this step includes the wireless network node listening to determine frequencies or channels in use by neighboring wireless network nodes and temporarily selecting the determined frequency to communicate with the other wireless network nodes as a part of negotiating entry onto the network and selecting frequencies of operation that minimize interference and improve efficiency, as will be described in greater detail below. Once the wireless network node has determined the frequencies that are in use by its neighboring wireless network nodes, the wireless network node enters a frequency self-selection phase of its initialization process. More generally, this step involves requesting frequency and beam information from its neighbor's (step 44), creating a ranked list of frequencies (step 46), selecting a frequency (step 48) and advising each of the other (neighboring) nodes of the selected primary frequency (step 50) and advising each of the other (neighboring) nodes of the corresponding beam for the selected frequency (step 52).

Figure 4:
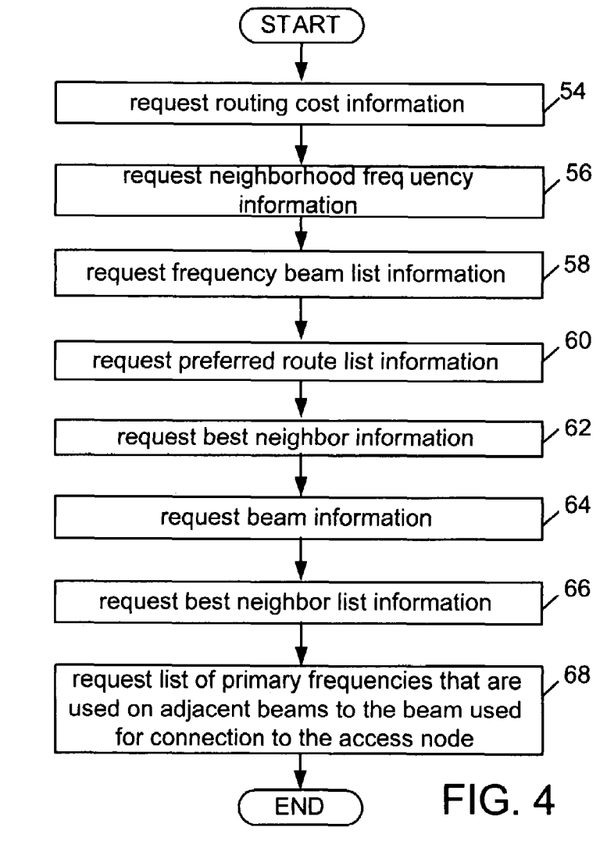
FIG. 4 illustrates a method for requesting frequency and beam information according to one embodiment of the present invention.

The method of FIG. 3 included requesting frequency and beam information in step 44. FIG. 4 illustrates a method for requesting frequency and beam information of step 44 in greater detail according to one embodiment of the present invention. The frequency self-selection phase includes requesting information from each of the other wireless network nodes with which the wireless network node communicates. Specifically, the wireless network node requests routing cost information (step 54), neighborhood frequency information (step 56), frequency beam list information (step 58), preferred route list information (step 60), best neighbor information (step 62), beam information (step 64), and best neighbor list information (step 66).

The routing cost information requested in step 54 enables the node to decide which neighboring node offers the best (lowest cost) route back to the network. The routing cost function can be calculated based on many factors. As an example, it could be calculated as the neighboring node's cost function plus the transit link cost function to that particular node. Since not all the transit links will have the same signal-to-noise ratio due to proximity and propagation conditions they will run at different data rates (and have different cost functions). The link cost function may be the inverse of the data rate on the link when exchanging messages, which represents the nominal cost in transmission time of using the link. The neighboring node that offers the best route is called the node's "best neighbor". The best neighbor's neighborhood frequency is called a "primary" frequency, and the transit link to the best neighbor is part of a "preferred" route. The neighborhood frequencies of all other neighbors are called "secondary" frequencies and their associated transit links are called "mesh" links. These secondary links provide alternative paths through the network. However, these links may be used for traffic, in the future as the network evolves or propagation conditions change and become preferred routes. That is to say, the determination of preferred routes is not fixed for the life of the network. In fact, it is an important part of the system design for the distributed, wireless access network, to enable these routes to change over time to adapt to changes in deployment, traffic and propagation conditions. The reason for distinguishing between preferred routes and mesh routes is that when traffic is flowing across the network, the majority will be flowing along preferred routes, and hence it is important that these "major highways" are free from interference from other nodes in the system. In the event that these highways do become congested, or subject to interference and the traffic is delayed, the operational routing cost function may change accordingly, and the nodes will adapt their routing and use alternate routes across the network. The algorithm for routing and controlling the routing cost function is not part of this invention, although importantly, the frequency selection algorithm is designed to work in a changing environment and is thus working in harmony with changes in the topology of the network.

The node also requests information in step 56 about the neighborhood frequency for each of the nodes with which it communicates during the initial search phase to determine what frequencies are in use by the neighboring nodes. The request from the wireless network node about neighborhood frequencies also prompts each neighboring wireless network node to also inform the node of the frequencies of its neighbors used as primary and secondary frequencies.

The frequency beam list information requested by the wireless network node in step 58 prompts each wireless network node to reply with a list of all the primary frequencies and their respective beams. Each node has a multiplicity of directional antenna beams as depicted in FIG. 2. Communication over each transit link to each respective neighbor is via one such beam on each node. The beam selected for each link is chosen on the basis of an appropriate criterion, such as the highest received signal strength; hence, the directional nature of the antenna beams improves the link gain and also decreases the signal strength from interfering sources if they arrive from different angular directions. Although a primary frequency on any beam has the potential to interfere, those on the same beam as the new node would give rise to the strongest interference, followed by those on adjacent beams, and finally by those on any beam. Hence, there is a preference to what frequency should be re-used.

The wireless network node also requests information from each of the other nodes regarding the preferred route information in step 60. The preferred route information comprises a list of all the primary frequencies and their respective beams. The wireless network node also requests information (in step 62) from each of the wireless network nodes regarding its best neighbor. More specifically, the wireless network node requests information regarding the beam and frequency of its best neighbor. Additionally, the wireless network node requests that each of the other wireless network nodes provide information (in step 64) regarding the beam that will be used to communicate with the wireless network node (the new wireless network node negotiating its way on to the network).

The wireless network node requests (in step 66) that each of the other nodes provide its best neighbor list. This includes providing information, including a list of all primary frequencies, and a list of primary frequencies that are used on the same beam used for connection to the wireless network node (the new node). Finally, the wireless network node requests, in step 68, a list of primary frequencies that are used on adjacent beams to the beam used for connection to the wireless network node (the new node).

Once the new node has collected all the information from all of its neighbors, the node assigns suitable weighing factors to the frequencies. In one exemplary embodiment of the invention, the arrangement of such weighing factors is as shown in Table 1:

TABLE 1

Exemplary Weight Assignments

| Name of Weight | Weight applied to | Value |
| --- | --- | --- |
| w_pr_on_beam | Primary frequency on the same beam | 1 |
| w_pr_adj_beam | Primary frequency on an adjacent beam | 2 |
| w_pr_any_beam | Primary frequency on any beam | 3 |
| w_m_on_beam | Secondary frequency on the same beam | 2 |
| w_m_adj_beam | Secondary frequency on an adjacent beam | 3 |
| w_m_any_beam | Secondary frequency on any beam | 4 |
| w_m_pr_freq | Primary frequency used by a node that is not the best neighbor | 3 |
| w_bn2_freq | Neighborhood frequency of best neighbor's best neighbor (bnbn) | 5 |
| w_bn2_on_beam | Primary frequency of bnbn on the same beam | 6 |

TABLE 1-continued

Exemplary Weight Assignments

| Name of Weight | Weight applied to | Value |
| --- | --- | --- |
| w_bn2_adj_beam | Primary frequency of bnbn on an adjacent beam | 7 |
| w_bn2_any_beam | Primary frequency of bnbn on any beam | 8 |

The values assigned to weighing factors are important as they enable the new node to distinguish suitable frequency choices when the local usage of frequencies is crowded, or there may be several possible choices, none of which is obviously better. The table gives a suitable set of weight values that may be used for an operational system. These values have been found to work well in practice. Other values or sets of values may work well for other networks. It is desirable that these weights can be modified, in later releases of the controller software, as more optimum values are determined. To facilitate this, the software can be downloaded "over-the-air" to nodes in a deployed and operational network, or even acquired after node authentication has taken place. Moreover, new weighing factors could be added to take into account additional radio parameters, such as polarization of the signal or the propagation distance to the frequency channel usage.

The new node knows what frequency and beam it uses to communicate to each of its respective neighbors. Hence it can determine what neighboring nodes are on the same beam or adjacent to its best neighbor, etc. In this way the new node can calculate which weighing factors are applicable to each frequency. If more than one weighing factor is applicable to a frequency, the minimum weighing factor is assigned; if no weighing factors are applicable, the weighting is given a default maximum value (e.g., 20).

The new node will also be aware of the allowed channels for its installation area (i.e., the channels allowed under FCC rules) and any local conditions that may be applicable (e.g., indoor or outdoor location, country of operation). For example, see the applicants' co-pending application being filed concurrently and entitled, "Method, Apparatus and System of Configuring a Wireless Device Based on Location", having a Ser. No. of 10/682,086 and filing date of Oct. 10, 2003. As part of its survey of the activity on the frequency channels, the new node will also note the usage of other systems and, hence, which channels may be blocked from usage in its area. As an example, for a system operating in an unlicensed frequency band that is shared with other equipment, such as microwave ovens that typically occupy the center of the unlicensed band, the new node may find the center of band channels blocked and, hence, have a preference for choosing the channels at the edge of the band.

Once all the weighing factors are calculated for all the frequencies, the most appropriate frequency (the frequency with the highest weight) is selected. This is the selected frequency for the new node for its so-called "neighborhood mode" frequency. A node may communicate with neighbors on either its neighborhood frequency or the neighbor's neighborhood frequency, as is described in the above-referenced Provisional filings.

An example of the frequency selection process, after the weights are calculated, is now given. If the frequency weightings are [F1=10, F2=0, F3=3, F4=3, F5=10] the frequency selection would be a random choice between F1 and F5. If the frequency weightings are [F1=0, F2=1, F3=5, F4=4, F5=5] the frequency selection would be a random choice between F3 and F5. If the frequency weightings are [F1=0, F2=1, F3=7, F4=2, F5=3] the frequency selection would be F3.

Figure 5:
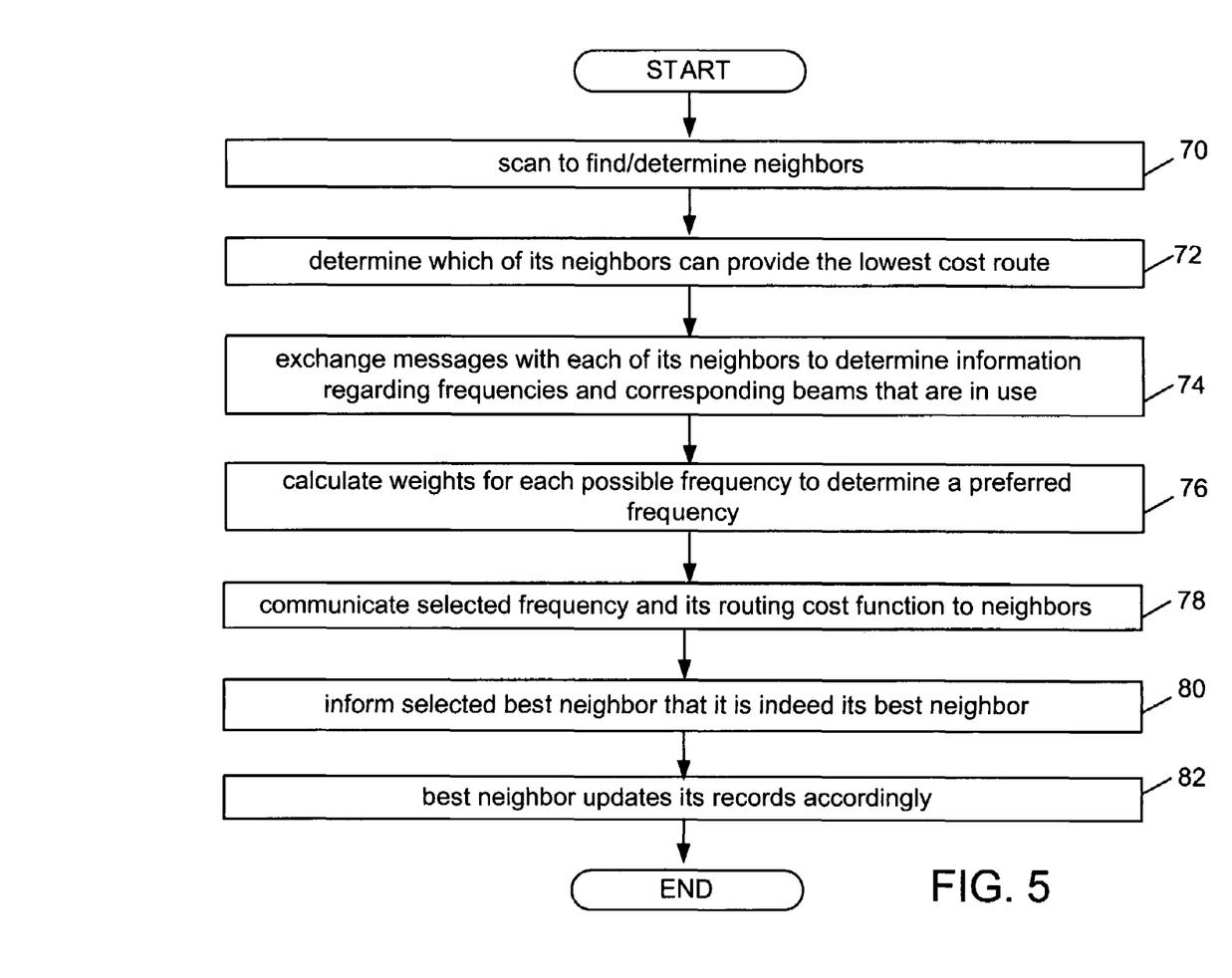
FIG. 5 is a flowchart that illustrates one embodiment of the present invention.

FIG. 5 is a flow chart that illustrates one embodiment of the present invention. Initially, a new wireless network node seeking to determine an operating frequency scans to find/determine its neighbors (step 70). As a part of this, the new wireless network node determines which of its neighbors can provide the lowest cost route (step 72). The new wireless network node further exchanges messages with each of its neighbors to determine information regarding frequencies and corresponding beams that are in use (step 74). Using the received information, the new wireless network node calculates weights for each possible frequency to determine a preferred frequency (step 76). Generally, the above steps are similar to those of FIGS. 3 and 4 and may be varied. Once a new node has selected a frequency, it then communicates this together with its routing cost function to all of its neighbors (step 78). Finally, the new node also informs its selected best neighbor that it is indeed its best neighbor (step 80). The best neighbor updates its records accordingly (step 82) and the new node now becomes an existing (or "connected") node.

Figure 6:
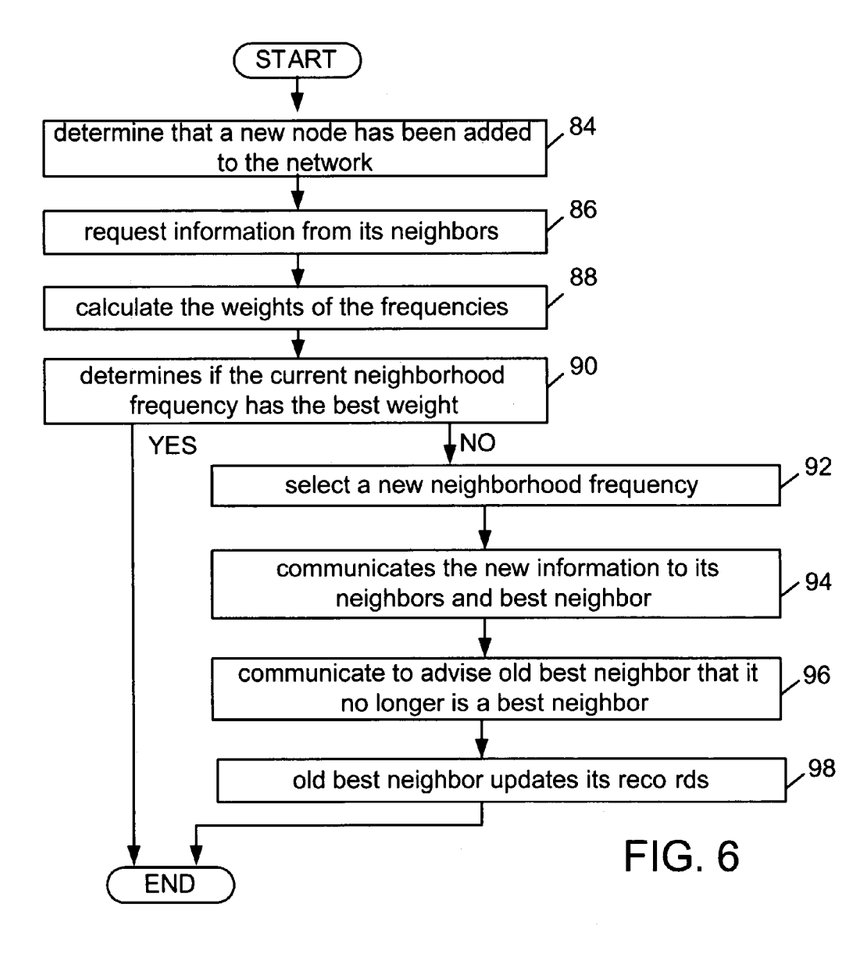
FIG. 6 is a flowchart that illustrates a method for updating a neighborhood frequency whenever a new wireless network node has been added to the network according to one embodiment of the present invention.

FIG. 6 is a flow chart that illustrates a method for updating a neighborhood frequency whenever a new wireless network node has been added to the network according to one embodiment of the present invention. If a new node is added in the middle of a network, an existing node may discover that the new node offers a better route. Thus, an existing wireless network node first determines that a new wireless network node has been added to the network (step 84). The existing node must then determine whether the new node should be its best neighbor. The process for making this determination is the same as the process as determining which wireless network node should be a best neighbor. If the existing node determines a new wireless network node has been added to the network, the existing node requests information from its neighbors as described before (step 86) and calculates the weights of the frequencies (step 88) to determine which frequency has the best weight. The existing node then determines if the current neighborhood frequency has the best weight (step 90). If the weight of its existing neighborhood frequency is worse (below) than any other frequency weights, then it selects a frequency as described above (step 92); otherwise, no change is made. If a new frequency is selected as a neighborhood frequency, the existing node also communicates the new information to its neighbors and best neighbor as described above (step 94). It also communicates to its old best neighbor to tell it that it is no longer a best neighbor (step 96). The old best neighbor updates its records accordingly (step 98).

The method of FIG. 6 is, generally, exemplary of a node that determines whether it needs to change its neighborhood frequency and its best neighbor because a new node was added to the network. The same procedure applies to other circumstances. For example, if a wireless network node's best neighbor changes frequency (for example, as described in the above paragraph), then a wireless network node performs most of the process of FIG. 6 of calculating the weights and assessing whether it should also change frequency. The primary difference with what was illustrated in FIG. 6 is step 84. Here, step 84 is replaced by the step of determining that the best neighbor changed frequency. As in FIG. 6, the wireless network node will only change frequency if the weight of the existing frequency is worse (below) than any other frequency weight. It then communicates the new information to its neighbors.

In the described embodiment of the invention, a wireless network node adapts its route and re-selects frequencies if the route or best neighbor changes. Adjacent nodes (e.g., nodes that are not on a preferred route with a given node) are not required to change their frequency, however, their frequency weights may change, indicating that there may be a better choice available. Preferably, re-selection of frequencies is limited to those nodes that are on preferred routes, i.e., if the best neighbor changes, or the frequency of the best neighbor changes. This is to avoid continuously updating frequencies. Such an arrangement allows for frequency optimization where it is needed most, while at the same time minimizes repetitive reselection of frequencies in the remainder of the network. The solution is periodically, at times of low traffic (e.g., at night), to perform a frequency re-selection of the whole network, starting with the nodes with the lowest routing cost function and working out towards the network edge. In this way, the network re-calibrates itself and achieves improved performance due to less interference. During this process, each node is given a "null" frequency, until it itself receives a message to perform frequency re-selection, in this way the priority of frequency choice is given to nodes nearer the network connection, because it is these nodes that will be carrying the most traffic, and hence need the most reliable links and have preferential choice of frequencies.

Figure 7:
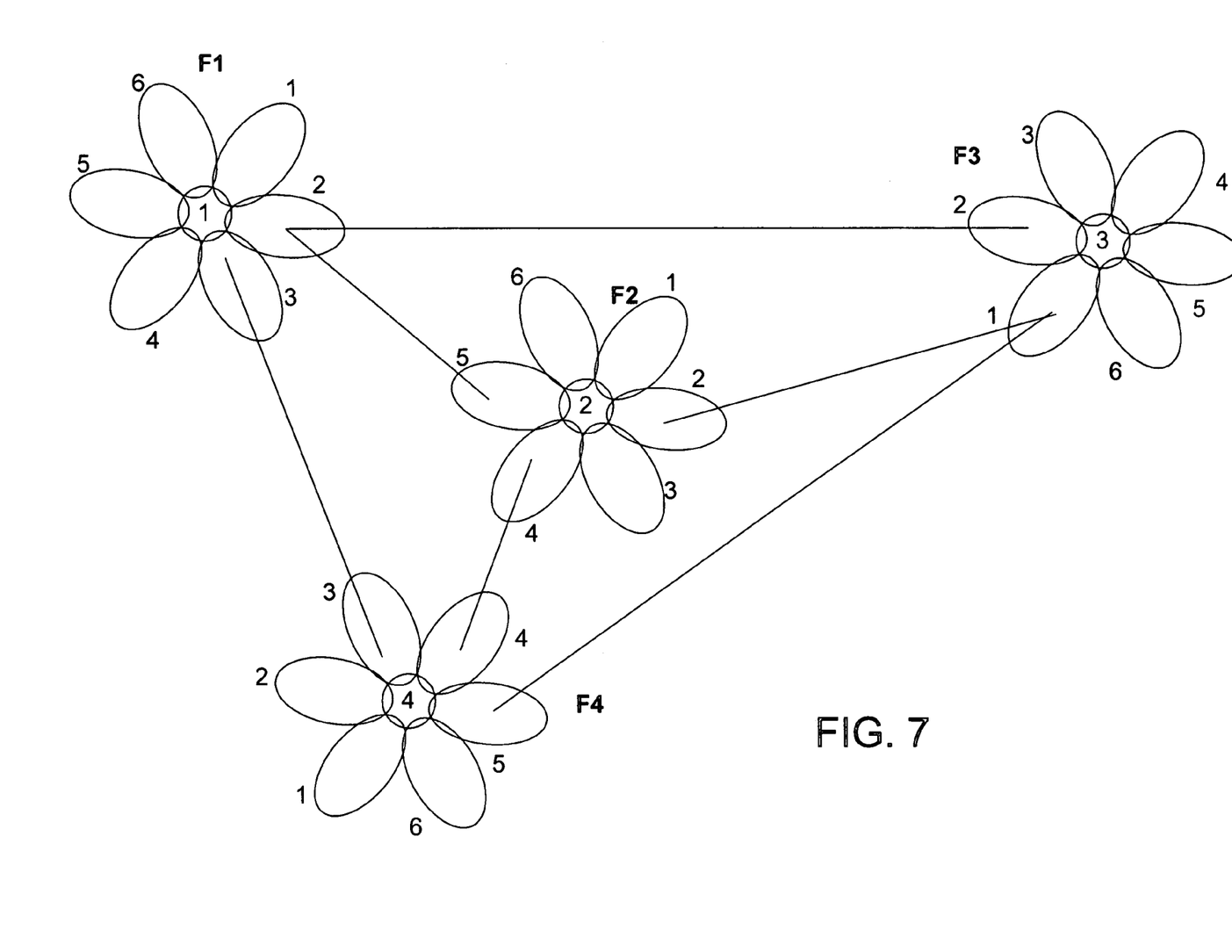
FIG. 7 is a functional diagram illustrating the operation of a network according to one embodiment of the invention.

FIG. 7 is a functional diagram illustrating the operation of a network according to one embodiment of the invention. Referring to FIG. 7, the nodes are numbered in deployment order. The neighborhood frequency selected for each node is shown pre-fixed by the letter 'F', so the node that was deployed first has selected F1 for its neighborhood frequency. The described embodiments also assume to aid description that node 1 has a wired network connection and operates as the network access node.

Node 2 is Deployed

The first weight to apply is that of the best neighbor's neighborhood frequency. Node 2 discovers node 1 and requests information about the frequencies and beams in use. The only information node 1 gives node 2 is that its neighborhood frequency is F1. Node 2 already knew this, as it discovered node 1 in the first place and also communicates with it. Thus, when a new node communicates with another node, the neighborhood frequency of the existing node is always known. Node 2 is then free to select any frequency from its possible list except F1. It selects F2. Node 2 informs node 1 of its neighborhood frequency and also that it is its best neighbor. Node 1 records that on beam #2 it has a primary frequency channel F2. Node 2 records that its best neighbor has neighborhood frequency F1 and is on beam #5.

Node 3 is Deployed

Node 3 is then added to the network. It discovers nodes 1 and 2. It exchanges routing cost function information and determines that the lowest cost route is through node 1. Node 3 requests frequency and beam information from nodes 1 and 2. Node 1 informs node 3 that it is using beam #2 to communicate with it and also that it has a primary frequency, F2, in use on beam #2. Node 2 informs node 3 that it is using beam #2 to communicate with it and that it has a primary frequency, F1, on beam #5. Node 2 also informs node 3 that its best neighbor is using F1 and its best neighbor is on beam #5.

Node 3 must now calculate the frequency weights. F1 is assigned the minimum value of {0, w_m_pr_freq} which of course is 0. F2 is assigned the minimum of {w_pr_on_beam, w_m_adj_beam}. All other frequencies are assigned the default maximum value, e.g., 20. Node 3 selects F3 for its neighborhood frequency. Node 3 informs nodes 1 and 2 of its neighborhood frequency. Node 3 informs node 1 that it is its best neighbor. Node 1 records that on beam #2 it has primary frequency channel F3 in addition to F2. Node 2 records that on beam #2 it has a secondary frequency channel F3. Node 3 records that on beam #1 it has secondary frequency F2.

Node 4 is Deployed

Node 4 is then added to the network. It discovers nodes 1, 2 and 3. It exchanges routing cost function information and determines that the lowest cost route is through node 1. Node 4 requests frequency and beam information from nodes 1, 2 and 3. Node 1 informs node 4 that it is using beam #3 to communicate with it and also that it has primary frequencies, F2 and F3, in use on beam #2. Node 2 informs node 4 that it is using beam #4 to communicate with it and that it has a primary frequency, F1, on beam #5, and a secondary frequency, F3, on beam #2. Node 3 informs node 4 that it is using beam #1 to communicate with it, it has secondary frequency F2 also on beam #1 and a primary frequency F1 on beam #2.

Node 4 must now calculate the frequency weights. F1 is assigned the minimum of {0, w_m_pr_freq}. F2 is assigned the minimum of {w_m_adj_beam, w_pr_adj_beam}. F3 is assigned the minimum of {w_m_any_beam, w_pr_adj_beam}. Node 4 selects F4 for its neighborhood frequency. Node 4 informs nodes 1, 2 and 3 of its neighborhood frequency. Node 4 informs node 1 that it is its best neighbor. Node 1 records that on beam #3 it has primary frequency F4. Node 2 records that on beam #4 it has secondary frequency F4. Node 3 records that on beam #1 it has secondary frequency F4. Node 4 records that on beam #4 it has secondary frequency F2, on beam #5 it has secondary frequency F3.

Figure 8:
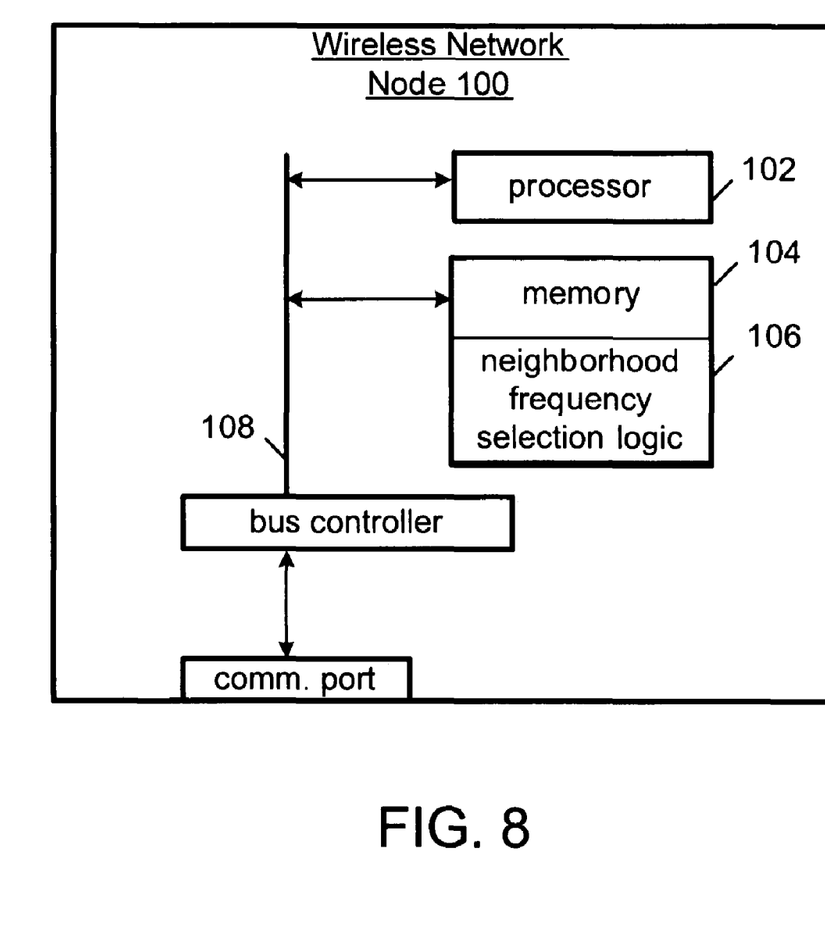
FIG. 8 is a functional block diagram illustrating an wireless network node formed according to one embodiment of the invention.

FIG. 8 is a functional block diagram illustrating a wireless network node formed according to one embodiment of the invention. A wireless network node 100 includes a processor 102 that is coupled to receive computer instructions stored within a memory 104 and, more particularly, within a memory portion 106 that includes computer instructions retrieved from memory 104 by way of a bus 108 that define operational logic for selecting neighborhood frequencies as described herein. Generally, memory 104 includes computer instructions that define operational logic for the wireless network node, including instructions that relate to routine operations of the wireless network node. Additionally, the computer instructions in memory portion 106 define logic as described in each of the above described method steps and logic to result in operation as described according to the various embodiments of the invention. Generally, the computer instructions include logic for the wireless network node determining when to communicate with other wireless network nodes to receive frequency and beam information and logic for selecting an optimum neighborhood frequency. The computer instructions also define logic for interacting with a wireless network node that is performing the process of selecting a neighborhood frequency. Thus, for example, the computer instructions define logic for the wireless network node whenever it receives a request for information (logic to provide the information), an indication that it is a best neighbor (to store the appropriate information as described) or an indication that it no longer is a best neighbor.

Referring again to FIG. 2 in view of the foregoing discussions, antenna system 36 features a multi-beam dual polarized antenna for each of the antennas 38. The dual polarized antenna can be used in a number of ways:

1. transmissions could be all of one polarization, with reception using the matching polarization;
2. transmissions could be all of one polarization, with reception using polarization diversity (i.e., the radio selects which antenna polarization is used based on a received signal quality metric); and
3. transmit and receive polarizations could be chosen so as to minimize co-channel and adjacent channel interference.

The frequency self-selection algorithm so far described works with polarization options 1 and 2 without any modification. If the system is configured to use option 3, additional information is required by the algorithm. Each node must also communicate the respective 4 polarizations along with the beams and frequencies and another weight needs to be added to the list: w_pol. This weight is an additive weight, such that its value is added to the other applicable weights, thus increasing the frequency weight. For example, if options 1 and 2 were used, w_pol would be set to 0 and no change would be seen. If option 3 was chosen, w_pol would be set to a small but finite value, i.e., 2. This would then be added to the applicable frequency weights, making their frequencies more desirable.

So far the discussion of the method of the present invention has been with respect to co-channel interference. This is because this is the most dominant and damaging form of interference. If co-channel interference can be managed successfully, the next type of interference to tackle is that of adjacent channel interference. Here, when a node has a choice of frequencies to select, i.e., where more than one frequency weight is equal, the algorithm goes into a secondary phase, where it weights the remaining frequencies (i.e., the frequencies whose weights are equal) according to their proximity to frequencies with low weights. For example, if the frequency weighting list is [F1=3, F2=5, F3=0, F4=5, F5=5], the co-channel selection would pick randomly from F2, F4 and F5. However, with the application of the adjacent channel selection, F2 and F4 would be reduced in weight because they are adjacent to the frequency whose weight is lowest; hence, the appropriate selection is F5. In another example, [F1=0, F2=3, F3=5, F4=3, F5=2, F6=1, F7=5] the co-channel selection would pick randomly from F3 and F7. However, with the application of the adjacent channel selection, F3 would be picked because its adjacent channels have higher weights than the adjacent channels of F7. In the case where after elimination of one frequency choice from a possible choice of three or more, the remaining adjacent channel frequency weights are examined again and the process is repeated iteratively until either all frequencies have the same co-channel and the same adjacent channel weights or one frequency is clearly the preferred choice. For example, [F1=0, F2=5, F3=3, F4=3, F5=5, F6=1, F7=5, F8=4] the co-channel selection would pick randomly between F2, F5 and F7. However, with the application of the adjacent channel selection, F2 is clearly not a good choice, so the remaining frequencies are F5 and F7, both of which have an equally poor adjacent channel (F6). However, their other adjacent channels have different weights, so, in fact, F7 is the better choice.

The measurement of interference is, in practice, complicated to implement and perform. This is because of a number of reasons, including (a) the interference may have an unknown bandwidth, (b) the interference may occur sporadically for very small amounts of time, (c) the level of the interference may be close or even slightly below the receiver noise floor, and (d) more than one interference source may be present simultaneously. Hence, a method is required that does not measure the interference. Measurements of data rate and received signal strength to neighbors can be measured more readily without the need for special measuring apparatus.

This discussion has been given in the context of selecting the frequencies that the nodes will use for communications among themselves. The nodes that also contain access functionality (e.g. are an 802.11 access point or a GSM base station) may use the same process to select the access frequency channels. As the technique of the invention serves to maximize the operating (radio propagation) separation distance between nodes reusing the same frequencies, it will also maximize the separation for the reuse of the access link frequencies. Hence these may also be assigned in an optimum manner by including information about the access frequency usage in the messages exchanged among the neighbors, creating a table of weights for these frequencies and their antenna patterns and selecting an appropriate access frequency set at each node as the one with the best weighting.

The invention disclosed herein is susceptible to various modifications and alternative forms. Specific embodiments therefore have been shown by way of example in the drawings and detailed description. It should be understood that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method in a self-configuring, distributed wireless network node of a network, for automatic self assignment of frequency channels, comprising:
   one of determining that the wireless network node is being added to the network, determining that another wireless network node has been added to the network, determining that another wireless network node has changed a primary frequency, or determining that a schedule frequency selection process is to be performed;
   transmitting information request signals to obtain prescribed criteria for selecting a frequency, the prescribed criteria including frequency, beam and best neighbor information, to neighboring wireless network nodes in the network; and
   based upon responses including the prescribed criteria from the known wireless network nodes in the network, selecting a frequency and a best neighbor.

2. The method according to claim 1, wherein said prescribed criteria comprises frequency channel usage and environmental conditions.

3. The method according to claim 1, wherein said prescribed criteria comprises at least one of the following: routing cost function, neighborhood frequency, frequency beam listing, preferred wireless communications node routing list, propagation distance/proximity of channel usage in the network, best neighbor frequency and beam parameters, beam for communication with a new node, radio polarization, and best neighbor list.

4. The method according to claim 3, wherein said best neighbor list comprises at least one of the following criteria: list of primary frequencies, list of primary frequencies used on the same beam used for communication with a given wireless communications node, and a list of primary frequencies used on beams adjacent to the beam used for communication with a given node.

5. The method according to claim 4, comprising the step of assigning a weighing factor to said frequencies.

6. The method according to claim 5, wherein selection of a suitable channel comprises use of weighing factors based on beams and proximity (propagation distance measure) of the usage of channels in the neighborhood.

7. The method according to claim 6, wherein said weighing factors comprises at least one of the following factors:

| Name of Weight | Weight applied to |
| --- | --- |
| w_pr_on_beam | Primary frequency on the same beam |
| w_pr_adj_beam | Primary frequency on an adjacent beam |
| w_pr_any_beam | Primary frequency on any beam |
| w_m_on_beam | Secondary frequency on the same beam |
| w_m_adj_beam | Secondary frequency on an adjacent beam |
| w_m_any_beam | Secondary frequency on any beam |
| w_m_pr_freq | Primary frequency used by a node that is not the best neighbor |
| w_bn2_freq | Neighborhood frequency of best neighbor's best neighbor (bnbn) |
| w_bn2_on_beam | Primary frequency of bnbn on the same beam |
| w_bn2_adj_beam | Primary frequency of bnbn on an adjacent beam |
| w_bn2_any_beam | Primary frequency of bnbn on any beam. |

8. The method according to claim 1, wherein said prescribed criteria comprises at least one of interference, time of day, change in frequency weighing factor, node calibration or recalibration, and node traffic.

9. A wireless network node, comprising:
   a memory for storing computer instructions defining routine operational logic of the wireless network node and for storing computer instructions defining neighborhood frequency selection logic for selecting a frequency, a beam and a best neighbor based upon an event including at least one of the node being added to a network, another wireless network node has been added to the network, another wireless network node has changed a primary frequency, or a scheduled frequency selection process is to be performed; and
   a processor for executing computer instructions retrieved from the memory by way of a bus wherein the access controller operates according to the logic defined by the computer instructions.

10. The wireless network node of claim 9 wherein the computer instructions further define logic for transmitting information request signals to obtain prescribed criteria for selecting a frequency, the prescribed criteria including frequency, beam and best neighbor information, to neighboring other known wireless network nodes in the network.

11. The wireless network node of claim 10 wherein the computer instructions further define logic for selecting a frequency and a best neighbor based upon responses including the prescribed criteria from each other known wireless network node in the network.

12. The wireless network node of claim 11 wherein said prescribed criteria comprises frequency channel usage and environmental conditions.

13. The wireless network node of claim 12 wherein said neighborhood information comprises at least one of the following: routing cost function, neighborhood frequency, frequency beam listing, preferred wireless communications node routing list, propagation distance/proximity of channel usage in the network, best neighbor frequency, radio polarization, beam parameters, beam for communication with a new node, and best neighbor list.

14. The wireless network node of claim 13 wherein said best neighbor list comprises at least one of the following criteria: list of primary frequencies, list of primary frequencies used on the same beam used for communication with a given wireless communications node, radio polarization, and a list of primary frequencies used on beams adjacent to the beam used for communication with a given node.

15. The wireless network node of claim 14 wherein the computer instructions further define logic for assigning a weighing factor to said frequencies.

16. The wireless network node of claim 9 wherein the computer instructions further define logic for selecting a suitable frequency channel based on weighting factors for beams and proximity (propagation distance measure) of the usage of channels in the neighborhood.

17. The wireless network node of claim 16 wherein said weighing factors comprise at least one of the following factors:

| Name of Weight | Weight applied to |
| --- | --- |
| w_pr_on_beam | Primary frequency on the same beam |
| w_pr_adj_beam | Primary frequency on an adjacent beam |
| w_pr_any_beam | Primary frequency on any beam |
| w_m_on_beam | Secondary frequency on the same beam |

-continued

| Name of Weight | Weight applied to |
| --- | --- |
| w_m_adj_beam | Secondary frequency on an adjacent beam |
| w_m_any_beam | Secondary frequency on any beam |
| w_m_pr_freq | Primary frequency used by a node that is not the best neighbor |
| w_bn2_freq | Neighborhood frequency of best neighbor's best neighbor (bnbn) |
| w_bn2_on_beam | Primary frequency of bnbn on the same beam |
| w_bn2_adj_beam | Primary frequency of bnbn on an adjacent beam |
| w_bn2_any_beam | Primary frequency of bnbn on any beam. |

18. The wireless network node of claim 17 wherein said prescribed criteria comprises at least one of interference, time of day, change in frequency weighing factor, node calibration or recalibration, and node traffic.

19. The wireless network node of claim 9 further including computer instructions that define logic for receiving information request signals for said prescribed criteria and for responding.

20. The wireless network node of claim 9 further including computer instructions that define logic for receiving and processing an indication that the wireless network node is no longer a best neighbor and logic for removing a stored value indicating that the wireless network node is a best neighbor.

* * * * *